Jan. 12, 1937. T. J. CLARK 2,067,259
SAW CUTTER
Filed May 7, 1934 2 Sheets-Sheet 1
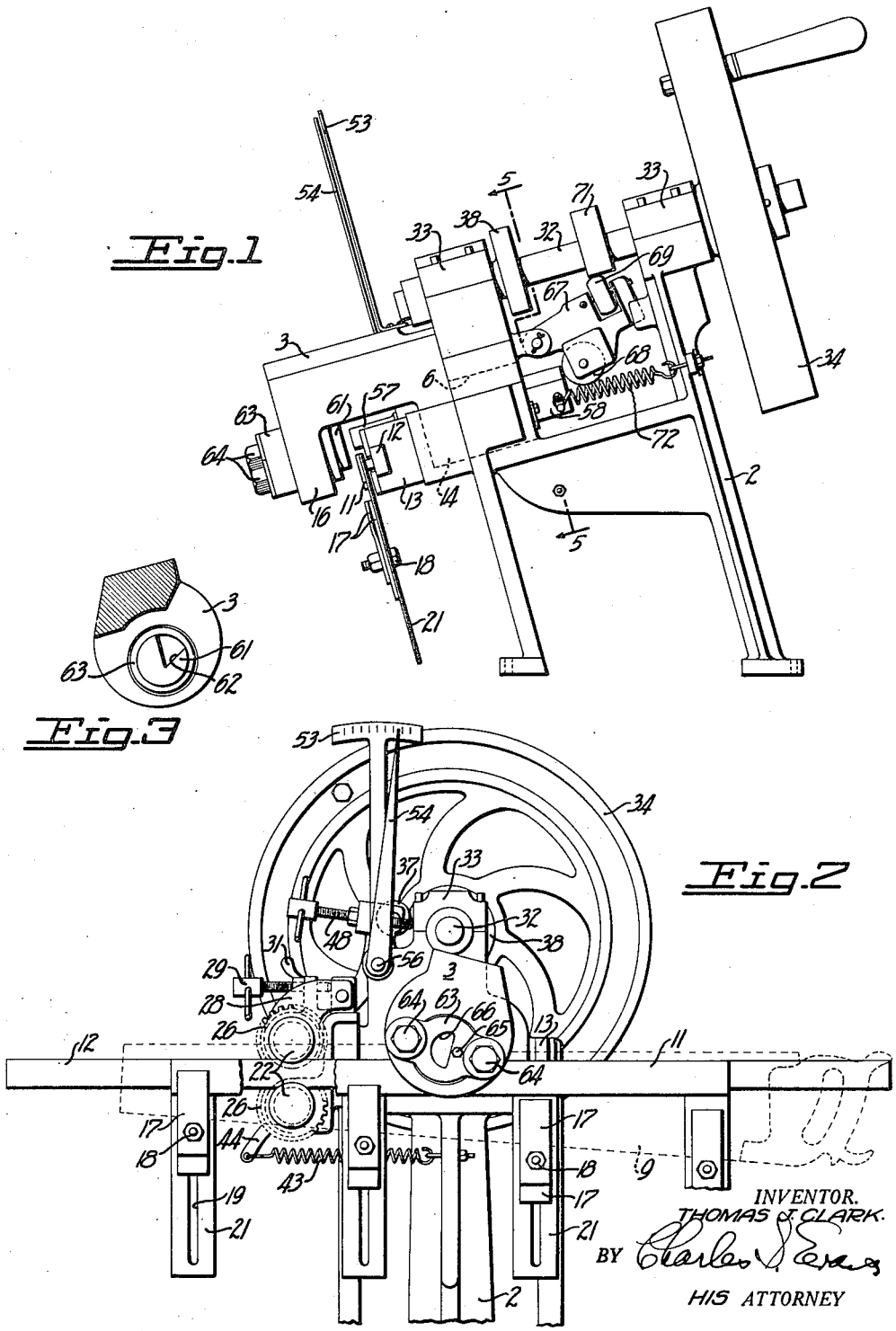
INVENTOR.
THOMAS J. CLARK.
BY
HIS ATTORNEY

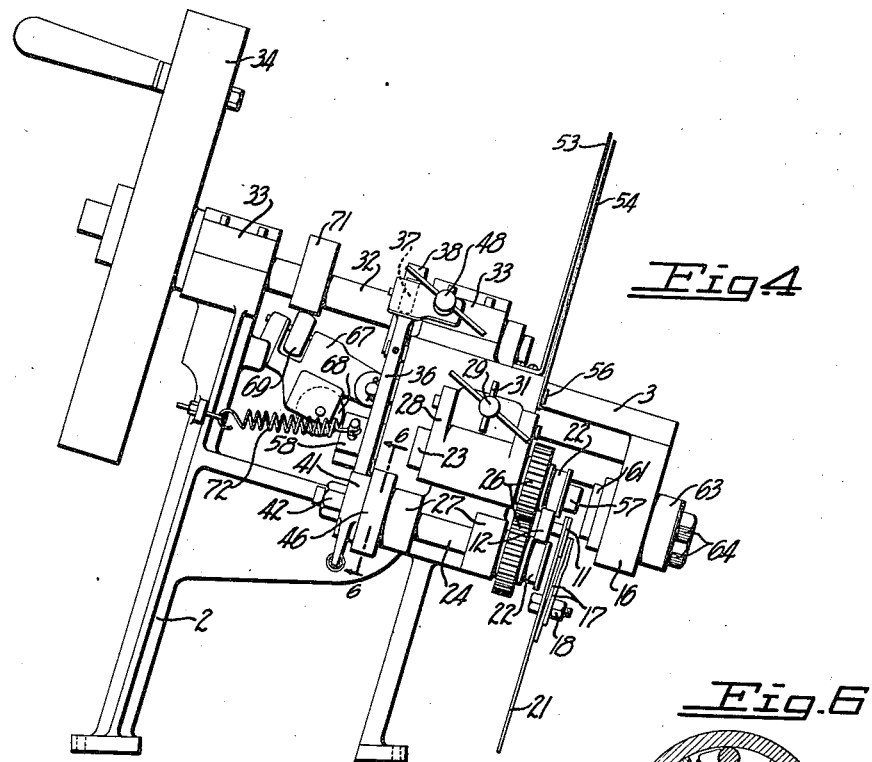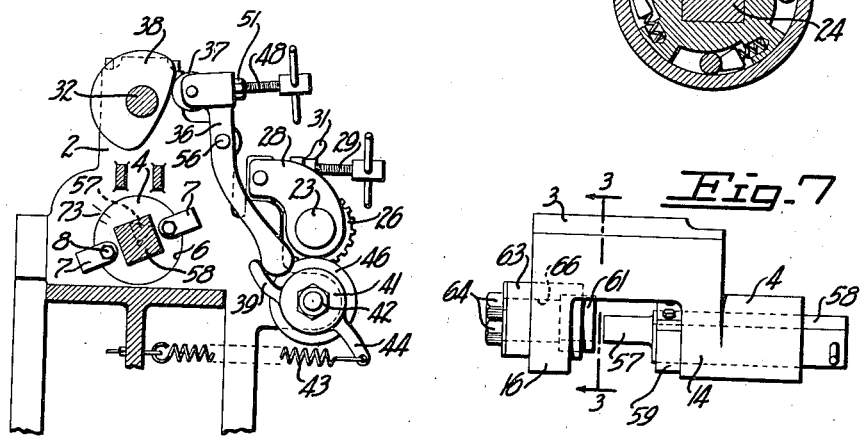

Patented Jan. 12, 1937

2,067,259

UNITED STATES PATENT OFFICE 2,067,259

SAW CUTTER

Thomas J. Clark, San Francisco, Calif.

Application May 7, 1934, Serial No. 724,258

7 Claims. (Cl. 76—29)

My invention relates to a saw cutter, and more particularly to a machine for re-toothing saws.

It is among the objects of my invention to provide a machine for re-toothing saws which punches out the old teeth while simultaneously cutting in the new ones.

Another object of my invention is to provide a machine which cuts the teeth quickly and accurately.

Still another object is to provide a machine which will cut over a wide range of points per inch.

Another object is to effect the above change in cutting by means of a simple adjustment, and without having to change the punch or die in the machine.

Another object of my invention is to provide a machine which automatically discharges its punching.

A further object is to provide a machine for re-toothing hand saws, and which cuts the teeth on a slight curvature to give the desired "crown" to the saw.

A still further object is to provide a machine of the character described which will cut either rip or cross-cut teeth, by a simple adjustment, and without having to change the punch or die in the machine.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a side elevational view of a machine embodying the improvements of my invention; and Figure 2 is a front elevational view of the same.

Figure 3 is a vertical sectional view taken transversely through the punching head, the plane of section being indicated by the line 3—3 of Figure 7.

Figure 4 is a side elevation opposite to that shown in Figure 1.

Figure 5 is a transverse vertical sectional view taken in a plane indicated by the line 5—5 of Figure 1.

Figure 6 is a detailed sectional view showing the overrunning clutch, the plane of section being indicated by the line 6—6 of Figure 4.

Figure 7 is a side view of the punching head, shown separately from the other parts of the machine.

In terms of broad inclusion, the saw cutter of my invention comprises a carriage for holding the saw. A punch is arranged on one side of the saw, and a die for the punch is arranged on the opposite side. Means are provided for intermittently moving the carriage, and means are provided for reciprocating the punch in time with the carriage movement. Means are also provided for adjusting the advance made by the carriage during a period of its movement, and means are preferably provided for rotatably mounting the punch and die to provide an angular adjustment of these elements relative to the saw.

In greater detail, and referring particularly to the drawings, the saw cutter embodying my invention comprises an inclined frame 2 having a yoke shaped punching head 3 mounted on its lower forward end. As shown in Figures 1 and 7, the punching head comprises a rearwardly extending and cylindrically shaped portion 4 which extends into a bore 6 provided in the front end of the frame. As better shown in Figure 5, the head is held in position by a pair of clamping arms 7 secured to the rear end of the portion 4 by suitable cap screws 8.

A carriage is provided on the frame for holding the saw 9 and comprises a clamping bar 11 connected with a rail 12 slidably mounted in a guideway 13 projecting from the frame alongside the punching head 3. The positioning of the carriage is such that it is movable through the recess formed between the legs 14 and 16 of the yoke shaped head. The saw is adjustably held on the carriage by a plurality of clamping arms 17 arranged in pairs to provide jaws and clamped by bolts 18 passing through slots 19 provided in plates 21 depending from the bar 11.

The saw carriage is driven by a pair of rollers 22 engaging opposite sides of the rail 12 and arranged on the side of the punching head opposite the guide 13 to provide a second point of support for the carriage. The drive rollers are mounted on shafts 23 and 24 also carrying a pair of meshed gears 26 for positively connecting the rollers for rotation together. The lower shaft 24 is journaled in fixed bearings 27 provided on the frame 2, while the upper shaft 23 is journaled in a bearing bracket 28 pivotally mounted on the frame.

This latter bracket mounting is provided for clamping the drive rolls 22 against the carriage rail, and the clamping is effected by an adjusting screw 29 threaded in the bracket and bearing against the frame. A wing nut 31 is preferably provided for locking the screw in a selected position of adjustment.

Means are provided for periodically driving the rollers 22 to advance the saw carriage with an intermittent motion through the punching head 3. In the hand operated machine shown for purposes of illustration the drive is effected by a main shaft 32 journaled on the upper portions of the frame in suitable bearings 33, and carrying a hand wheel 34 of sufficient weight to also function as a fly wheel. As best shown in Figures 4 and 5, a rocker arm 36 is pivotally mounted on the frame to work between the main shaft 32 and the roller shaft 24. The upper end of this arm carries a follower roller 37 riding on a cam 38 provided on the main shaft, whereby the rocker arm is given an oscillatory motion when the main shaft is rotated.

The lower end of the rocker arm operatively engages a finger 39 provided on a rotor 41 loosely journaled on the roller shaft 24 and held by a nut 42 threaded on a reduced portion of the shaft. The finger 39 of the rotor is resiliently held against the rocker arm by a spring 43 connected between the frame 2 and a second finger 44 provided on the rotor. A ring 46 connected with the rotor 41 comprises the outer portion of an overrunning clutch; the inner mechanism of which is mounted for rotation with the roller shaft 24, as best shown in Figure 6. Any suitable one-way clutch mechanism may be employed for this purpose.

By this arrangement the saw carriage is advanced through the punching head with an intermittent motion, the advance made in a period of movement depending upon the throw of the rocker arm, as will be readily appreciated. An adjustment is provided for regulating the advance made by the carriage by means of an adjusting screw 48 threaded in the upper end of the rocker arm and bearing against a portion of the frame 2, a nut 51 being preferably provided for locking this screw in a selected position of adjustment. This screw limits the inward movement of the follower roller 37, and determines the throw of the rocker arm, as will also be readily understood.

Means are preferably provided for indicating the advance made in a period of the carriage movement. This is effected by providing a scale 53 on the frame and across which a pointer 54 is adapted to move. The pointer is connected for movement with the drive mechanism of the carriage by mounting it on the shaft 56 which carries the rocker arm 36. By this arrangement the pointer will swing across the scale in ratio with the advance movement made by the carriage.

Means are provided for punching out the old teeth and simultaneously cutting in new ones as the saw advances through the punching head. For this purpose, and as best shown in Figures 5 and 7, a triangular shaped punch 57 is positioned alongside the saw on the side adjacent the yoke leg 14 of the punching head 3. The punch is formed on the inner end of a square shaped bar 58 slidably mounted in the head and projecting through the cylindrically shaped portion 4. A collar 59 on the inner end of the punch bar is provided for limiting the latter in its retracting movement.

A die 61 having a V-shaped recess 62 complementary to the similarly shaped face of the punch is provided on the opposite side of the saw, and is mounted in a holder 63 extending through the outer leg 16 of the punching head and secured to the head by suitable cap screws 64. In order to discharge the punchings knocked out by the punch, the die holder 63 is provided with an aperture 66 extending between the die and the outer face of the holder. This passage in conjunction with the inclined position of the frame operates to provide means for automatically discharging the punchings.

A screw 65 extending through the holder alongside the passage 66 provides a convenient means for securing the die. Note Figure 2.

As best shown in Figures 1 and 4, the means for driving the punch comprises a rocker arm 67 pivotally mounted on the frame 2 and carrying a roller 68 riding on the rear face of the punch bar 58 and a second roller 69 riding on a cam 71 provided on the main shaft 32. The punch bar 58 is held in its retracted position against the arm roller 68 by means of a pair of springs 72 connected between the rear end of the punch bar and the frame 2. These springs also operate to hold the roller 69 against the cam 71, as will be readily understood.

By this arrangement the rocker arm 67 is oscillated by a cam on the drive shaft to advance the punch against the saw with a reciprocating motion. This movement of the punch is of course synchronized with the movement of the saw carriage by reason of the fact that both of these elements are actuated by a common drive. Since the cutting takes place during a period of rest of the saw, the actuating cams 38 and 71 of the carriage and punch respectively are adjusted to time the movements so that the punch moves into and out of engagement with the saw during the rest periods in the intermittent motion of the carriage.

In the operation of my machine the hand saw 9 to be re-toothed is positioned between the clamping jaws 17 and shifted laterally (up and down) with respect to the punch so that a sufficient amount of the saw projects between the punch and die to knock out the old teeth as well as provide sufficient material to cut in the new ones. When this adjustment has been made the bolts 18 are tightened to clamp the saw. Adjusting screw 48 is then manipulated to determine the advance movement of the carriage, depending upon the number of points per inch that are desired in the saw. Where a large number of points are desired the advance movements of the carriage will be less than if fewer points are required. This of course is controlled entirely by the carriage drive, which in my machine is regulated by the single adjusting screw 48. The same punch and die serves over the entire range of teeth being cut, and the changing of these elements each time a different number of teeth is to be cut becomes unnecessary. A good range in this adjustment is given by my machine, as I have cut teeth over a range of from 3 to 20 points per inch. The scale 53 is preferably calibrated in points per inch, so that this adjustment may be quickly and accurately effected.

The carriage is then shifted to position the saw at the proper point for starting the cutting operation, and the drive rollers are clamped against the rail by tightening the adjusting screw 29. This conditions the machine for operation and the re-toothing is effected by merely turning the hand wheel 34.

With each forward movement of the punch 57, which passes through the saw blade during a rest period of the carriage, a V-shaped portion of the blade is punched out carrying with it the old teeth and forming a new set of points. Due to the inclined position of the frame the saw is held in a plane inclined to the vertical and the punch is arranged to work along an axis similarly inclined with respect to the horizontal. This arrangement of the parts causes the punchings to gravitate out through the discharge passage 66, as has already been pointed out.

For cross-cut saws the punching head 3 is oriented so that the bottom point of the punch is near its lowermost position, as shown in Figure 5. In this position the punch will cut the regular teeth required in a cross-cut saw. If a rip saw is being cut the cap screws 8 are loosened and the punching head rotated clockwise as shown in Figure 5 to shift the lower point of the punch toward the left. The cap screws are then tightened to lock the head in its new position of adjustment. By reason of the unitary mounting of the punch and die in the head 3 the adjustment of the head operates to simultaneously change the angular position of both punch and die with respect to the saw. In the new position the punch will cut the forwardly sloping teeth required on the rip saw. If desired, suitable markings 73 may be provided for facilitating the latter adjustment. Note Figure 5.

In the cutting of hand saws it is desirable to have the cutting edge on a slight curvature to provide the desired "crown" to the saw. In order to accomplish this result the carriage rail 12 is preferably formed with the curvature desired to impart to the cutting edge of the saw.

I claim:

1. A saw cutter comprising a carriage for holding the saw, a punch arranged on one side of the saw, a die associated with the punch and arranged on the opposite side of the saw, means for intermittently moving the carriage, means for adjusting the advance made by the carriage during a period of movement, a scale, a pointer associated with said scale and actuated by said carriage moving means for indicating said advance movement, and means for reciprocating the punch in time with said carriage movement.

2. A saw cutter comprising a carriage for holding the saw, a punch arranged on one side of the saw, a die associated with the punch and arranged on the opposite side of the saw, means for moving the carriage, means for moving the punch in time with said carriage movement, means for mounting the punch and die for simultaneous angular adjustment relative to the saw, and means for holding said punch and die in a selected position of adjustment.

3. A saw cutter comprising a carriage for holding the saw, a punch arranged on one side of the saw, a die associated with the punch and arranged on the opposite side of the saw, means for moving the carriage, means for moving the punch in time with said carriage movement, means for mounting the saw for lateral adjustment relative to the punch and die, means for holding the saw in a selected position of adjustment, means for mounting the punch and die for simultaneous angular adjustment relative to the saw, and means for holding said punch and die in a selected position of adjustment.

4. A saw cutter comprising a frame, a carriage on the frame for holding the saw, a punching head on the frame and extending across the path of movement of said carriage, a punch slidably mounted on the head adjacent one side of the saw, a die associated with the punch and mounted on the head adjacent the opposite side of the saw, means for rotatably mounting the punching head on the frame, means for locking the head against rotation to fix the punch and die in a selected position of angular adjustment relative to the saw, means for moving the carriage, and means for moving the punch in time with said carriage movement.

5. A saw cutter comprising a frame, a carriage on the frame for holding the saw, a punching head on the frame and extending across the path of movement of said carriage, a punch slidably mounted on the head adjacent one side of the saw, a die associated with the punch and mounted on the head adjacent the opposite side of the saw, a main shaft journaled on the frame, a second shaft journaled on the frame and connected to drive said carriage, an overrunning clutch having one of its rotating parts connected with the latter shaft, a rocker arm mounted on the frame and connected to rotate a second moving part of the clutch, a cam on the main shaft for oscillating the rocker arm, means for adjusting the position of said arm with respect to the cam, and means connected with the main shaft for driving the punch.

6. A saw cutter comprising a frame, a carriage on the frame for holding the saw, a punching head on the frame and extending across the path of movement of said carriage, a punch slidably mounted on the head adjacent one side of the saw, a die associated with the punch and mounted on the head adjacent the opposite side of the saw, a main shaft journaled on the frame, a second shaft journaled on the frame and connected to drive said carriage, an overrunning clutch having one of its rotating parts connected with the latter shaft, a rocker arm mounted on the frame and connected to rotate a second moving part of the clutch, a cam on the main shaft for oscillating the rocker arm, a second rocker arm mounted on the frame and bearing against the punch, and a second cam on the main shaft for oscillating the latter rocker arm.

7. A saw cutter comprising a frame, a carriage on the frame for holding the saw, a punching head on the frame and extending across the path of movement of said carriage, a punch slidably mounted on the head adjacent one side of the saw, a die associated with the punch and mounted on the head adjacent the opposite side of the saw, a main shaft journaled on the frame, a second shaft journaled on the frame, a rail on the carriage, a roller on the second shaft and drivably engaging said rail, a roller engaging an opposite side of the rail, means for moving the rollers together to grip the rail, means connected with the main shaft for periodically rotating the roller shaft, and means connected with the main shaft for driving the punch.

THOMAS J. CLARK.